United States Patent [19]
Lai et al.

[11] Patent Number: 5,799,025
[45] Date of Patent: Aug. 25, 1998

[54] SELF STARTING, SELF MODE-LOCKED LASERS

[75] Inventors: Ming Lai, Carlsbad; Shui T. Lai, Encinitas, both of Calif.

[73] Assignee: Novatic Laser Systems, Inc., Carlsbad, Calif.

[21] Appl. No.: 826,281

[22] Filed: Mar. 27, 1997

Related U.S. Application Data

[63] Continuation of Ser. No. 439,960, May 12, 1995, abandoned.

[51] Int. Cl.$^6$ ........................................... H01S 3/098
[52] U.S. Cl. ..................... 372/18; 372/101; 372/106
[58] Field of Search ........................ 372/18, 41, 101, 372/106

[56] References Cited

U.S. PATENT DOCUMENTS

| | | | |
|---|---|---|---|
| 5,079,772 | 1/1992 | Negus et al. | 372/18 |
| 5,097,471 | 3/1992 | Negus et al. | 372/18 |
| 5,163,059 | 11/1992 | Negus et al. | 372/18 |
| 5,173,908 | 12/1992 | Negus et al. | 372/18 |
| 5,185,750 | 2/1993 | Kafka et al. | 372/18 |
| 5,212,698 | 5/1993 | Kafka et al. | 372/18 |
| 5,265,109 | 11/1993 | Knox | 372/18 |
| 5,383,198 | 1/1995 | Pelouch et al. | 372/18 |
| 5,434,873 | 7/1995 | Delfyett | 372/18 |
| 5,440,573 | 8/1995 | Fermann | 372/18 |

Primary Examiner—Rodney B. Bovernick
Assistant Examiner—Robert E. Wise
Attorney, Agent, or Firm—Gilliam, Duncan, Harms

[57] ABSTRACT

A self starting, self mode-locked laser is disclosed that utilize a gain saturation lens and an optical Kerr lens to start and to sustain passive mode locking. The laser consists of a resonant cavity which has a saturable gain medium and an optical Kerr lens medium. The laser cavity is described such that the loss modulation induced by the gain saturation lens is cascaded to that of the optical Kerr lens to start the mode locking process, while the loss modulation of the Kerr lens maintains the mode locking. The self mode locking operation restores automatically without any additional induction mechanism, after the pump laser beam or the laser cavity is blocked and then unblocked. In a preferred embodiment, the laser includes a resonant cavity, a Ti:sapphire crystal which produces both the gain saturation lens and the optical Kerr lens, a prism pair for ultra-short pulse operation, and a slit for laser bandwidth control and wavelength tuning. This laser can produce stable pulses shorter than 100 femtosecond.

15 Claims, 2 Drawing Sheets

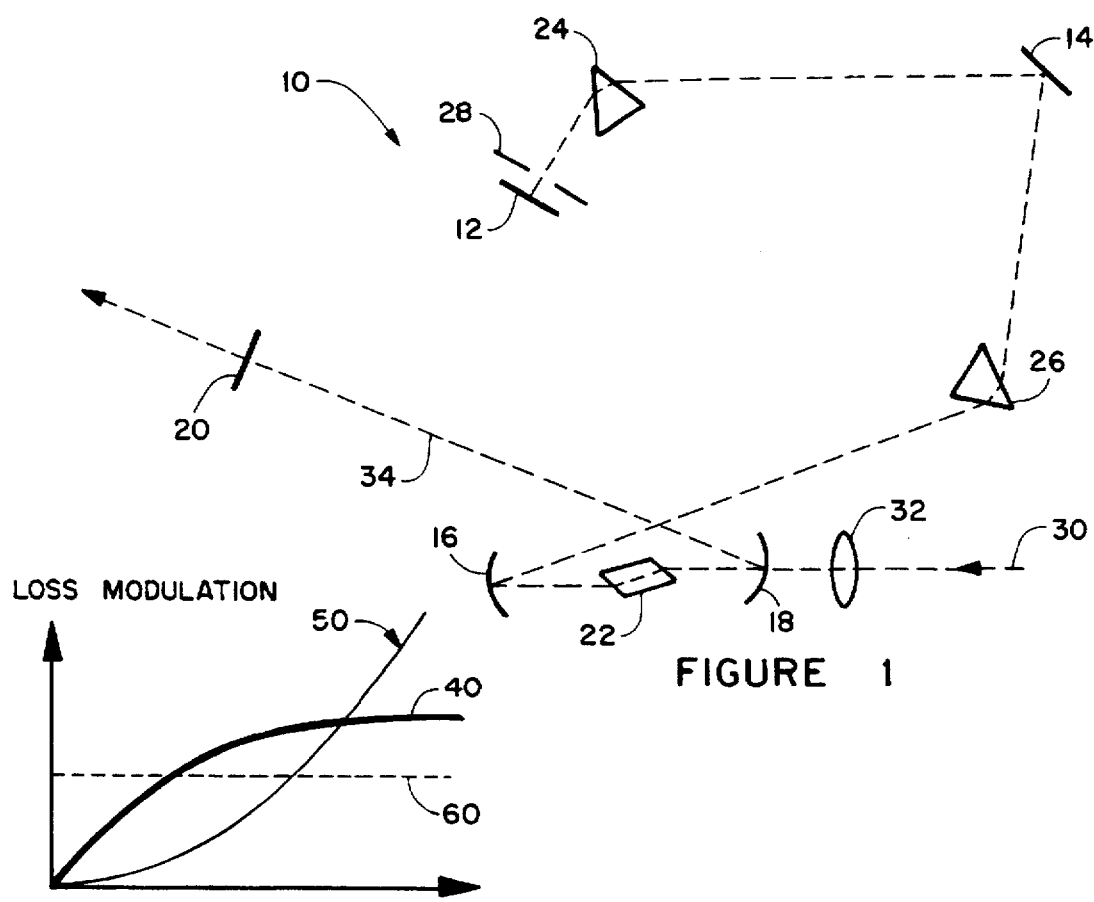
FIGURE 1
FIGURE 2
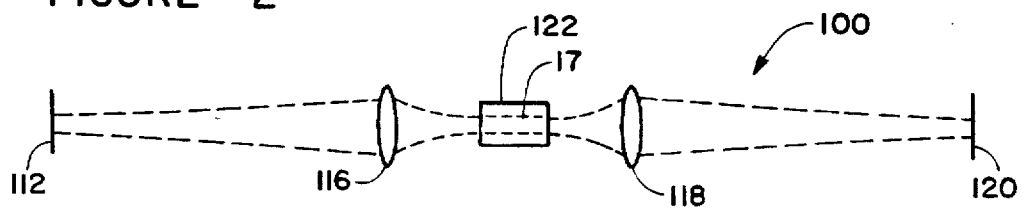
FIGURE 4A
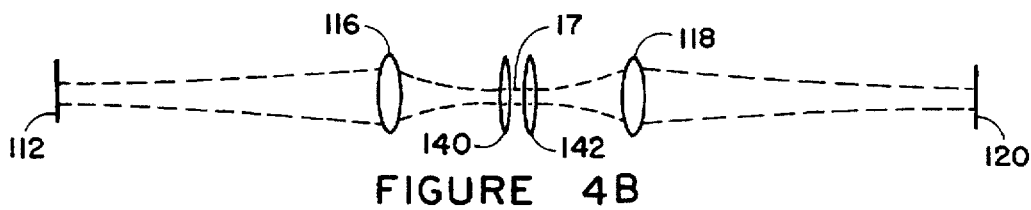
FIGURE 4B
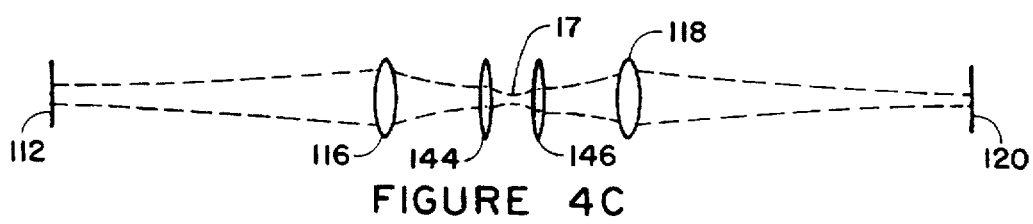
FIGURE 4C

SELF STARTING, SELF MODE-LOCKED LASERS

This application is a continuation of application U.S. Ser. No. 08/439,960 filed on May 12, 1995, now abandoned.

FIELD OF THE INVENTION

The present invention relates to a self starting, self mode-locked laser.

BACKGROUND OF THE INVENTION

Exploiting the optical Kerr effect to make a passive mode locker for ultrashort pulse generation is well known in the laser art. An ultra-fast lens effect is induced when a Gaussian beam impinges onto an optical Kerr medium such as a Ti:sapphire crystal, (a Kerr lens). When such a lens effect is induced inside a laser cavity, the mode structure (i.e., the beam size) of the laser changes accordingly. If an intracavity aperture is located at a position where the beam size decreases as the intracavity power increases, the laser cavity experiences an ultra-fast loss modulation similar to that caused by a saturable absorber. This similarity makes it possible to produce passive mode locking without using a saturable absorber, which is a well known technique of passive mode locking for ultra-short pulse generation. By using such a Kerr lens mode locking, picosecond and femtosecond pulses have been obtained in Ti:sapphire lasers and other solid state lasers.

Unfortunately, however, optical Kerr effect is usually weak and self starting of the mode-locking process is difficult to achieve. For example, the Kerr effect coefficient of Ti:sapphire is about $10^{-16} cm^2$ W. Hence, very high intensity is required to onset a Kerr lens mode locking. Consequently, Kerr lens mode locking does not start automatically. As disclosed in U.S. Pat. No. 5,097,471 (Coherent), an external induction mechanism is required to start the mode locking process. Starting mechanisms, such as active mode locking, coupled external cavity, mechanical shaking of cavity elements, are commonly used to onset the Kerr lens mode locking.

SUMMARY OF THE INVENTION

The present invention provides a new and improved type of self starting, self mode-locked lasers. Particularly, the present invention is to provide a simple laser oscillator wherein ultrashort optical pulses can start and sustain automatically. Generally, any ultra-fast nonlinear process can produce an ultra-fast lens effect. A lens effect induced by gain saturation, i.e., the lens effect related to the index change due to gain saturation, takes place at a much lower laser intensity than an optical Kerr lens does. That is, at low intracavity power, the gain saturation lens can be much stronger than the optical Kerr lens. Moreover, according to the Kramers-Kronig relation, the gain-saturation induced index change can be positive, negative or complex, depending on the laser wavelength relative to the gain center. Due to the nature of solid state gain media, however, the maximum modulation of a gain saturation lens achievable in a typical laser cavity is relatively small. Consequently, a gain saturation lens alone can not introduce a sufficient loss modulation to make a strong mode locking. In the present invention, the effects of both gain saturation lens and optical Kerr lens are utilized to make an automatic self starting, self mode-locked laser. The basic principle is to initiate the pulse formation through the loss modulations induced by the gain saturation lens at low laser peak power and then to cascade the mode locking effect with the optical Kerr lens as the laser pulse is getting shorter. When the peak power of the pulse reaches a threshold, the loss modulation induced by the optical Kerr lens will take over and ultra-short pulses can be produced and sustained.

The cavity loss modulation of an induced lens depends on greatly the sign, the amplitude, and the distribution of the induced lens, as well as the cavity design and configuration. When two lenses are induced inside a laser cavity, the corresponding cavity loss modulations are added up according to the relative phase and distribution of the lenses. Only when the relative phase and distribution of the induced lenses are adjusted properly, their effects on the cavity loss modulation can be enhanced. Since the gain saturation lens is dominate when the pulse peak intensity is relatively low and the optical Kerr lens becomes dominate when the pulse peak intensity is high, properly adjusted relative phase and distributions are the key elements for the cavity loss modulation of the two induced lenses to be cascaded to produce a self starting, self mode-locked laser.

With the present invention, a self starting, self mode-locked laser is obtained by optimizing and cascading the cavity loss modulations stemmed from a gain saturation lens and an optical Kerr lens. The self starting is achieved by controlling the gain lens and the Kerr lens parameters in addition to cavity alignment applied to a basic laser cavity. The present invention teaches to utilize gain saturation lens, cavity loss modulation, and an optimized cascading of the gain saturation lens and the optical Kerr lens to achieve automatic self-starting mode-locked lasers.

Laser cavities supporting Kerr lens mode locking can produce pulses shorter than 100 fs. Unlike other laser designs, however, the mode locking operation of this laser can start automatically, without using any starting aids.

The instant laser described herein has simplified structure to generate sub-picosecond laser pulses. The described method of automatic self starting of self mode locking can be applied to other solid state lasers.

Accordingly, it is an object of the present invention to provide a new and improved self starting, self mode-locked laser.

It is another object of the present invention to provide a self starting, self mode-locked laser by exploiting a gain saturation lens and an optical Kerr lens.

It is a further object of the present invention to provide a self starting, self mode-locked laser by optimizing and cascading the cavity loss modulation stemmed from the gain saturation lens and optical Kerr lens.

It is still another object of the present invention to provide a simple mechanism for self starting a self mode-locked laser.

It is still another object of the present invention to provide a self starting, self mode-locked laser wherein the gain saturation lens and optical Kerr lens are induced in the same medium.

It is still a further object of the present invention to provide a new and improved mechanism to self start a self mode-locked Ti:sapphire laser.

These inventions become apparent to those skilled in the art after considering the following drawing figures and detailed description.

BRIEF DESCRIPTION OF THE FIGURES

FIG. 1 is a schematic diagram of a self starting, self mode-locked laser cavity designed in accordance with the present invention wherein both the gain saturation lens and the optical Kerr lens are induced inside a Ti:sapphire crystal.

FIG. 2 depicts the amplitudes of cavity loss modulation stemmed from the gain saturation lens and the Kerr lens, respectively, as a function of intracavity peak intensity

FIG. 4a is a schematic diagram of a simplified cavity for analysis of the induced lens effect on cavity mode structure.

FIG. 4b is the effect of a pair of thin lenses positioned on the cavity mode structure of FIG. 3a wherein the lenses are induced within one confocal parameter length of the cavity mode.

FIG. 4c is the effect of a pair of thin lenses on the cavity mode structure of FIG. 3a wherein the lenses are induced outside the zone of one confocal parameter length.

DETAIL DESCRIPTION OF THE DRAWING FIGURES

Figure 3A:
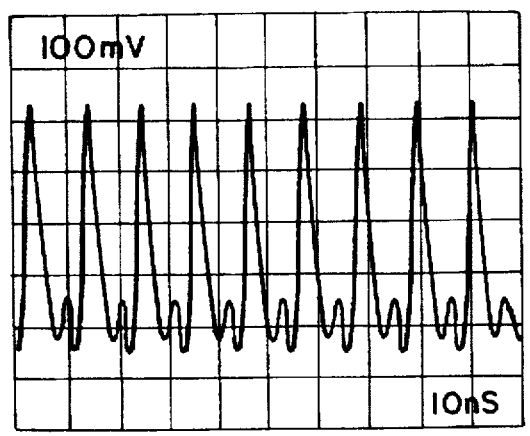
FIG. 3a is an oscilloscopic trace of self pulsing when the laser cavity of FIG. 1 is adjusted near the alignment for self starting, self mode locking.

FIG. 1 is a schematic diagram of a preferred embodiment of a laser cavity 10 configured in accordance with the present invention. The laser cavity 10 includes a resonant cavity (12, 14, 16, 18, 20), a gain medium 22, a pair of prisms 24 and 26, and a slit 28.

The resonant cavity is formed by mirrors 12, 14, 16, 18, and 20, of which all are dielectric coated for the laser wavelength of operation. Mirrors 12, 14 and 20 are flat and mirrors 16 and 18 are spherical. The mirrors are arranged as shown in FIG. 1. They are spaced and aligned such that the resonant cavity is stable and a beam waist 17 is formed between mirrors 16 and 18. Mirror 20 is also an output coupler for extracting laser power from the cavity.

For the preferred embodiment the gain medium 22 is a Ti:Al$_2$O$_3$ laser crystal which is located at a beam waist of the resonant cavity and is excited by a laser beam from pump laser 30. Other types of laser crystals with a board fluorescent and laser gain spectra can also be used as the gain medium. These crystals include Cr doped oxide and fluoride laser crystal, such as Cr:LiSAF and Cr:LiSGAF crystals, as examples. The pump laser beam 30 is focused onto the gain medium 22 by a spherical lens 32 to generate a laser beam 34, which is the product of the laser system. The pump laser beam 30 is aligned co-linear with the laser beam 34 for the best pumping efficiency.

The prism pair 24 and 26 are used to control the cavity group velocity dispersion so that ultra-short pulse could be generated. The slit 28 is used for bandwidth control and wavelength tuning.

In this embodiment, the gain medium 22 also produces both the gain saturation lens and optical Kerr lens. These induced lenses modify the cavity mode such that the cavity loss decreases as the peak power of the laser beam 34 increases. It is understood that such a cavity loss modulation drives the laser toward pulse operation. It is also understood that optical and mechanical disturbance sets a threshold for the pulse to form. It is further understood that optical Kerr lens becomes significant only when the laser pulse is sufficiently short.

FIG. 2 depicts the amplitudes of cavity loss modulation as a function of intracavity peak intensity. The heavy solid curve 40 is for the gain saturation lens, and the light solid curve 50 is for the optical Kerr lens. The dashed line 60 represents a threshold loss modulation over which a pulse can be developed. In the present invention, the gain saturation lens is used to produce a sufficient cavity loss modulation at low peak power to overcome the threshold of pulse forming and to onset the more powerful optical Kerr lens. With this approach, continuous wave operation is no longer a steady state and laser pulsing starts without additional driving element.

The laser wavelength and intracavity power level of FIG. 1 are chosen and adjusted such that a sufficient gain saturation lens can be produced. Also, the laser cavity 10 is designed and aligned such that the cavity loss modulation induced by the gain saturation lens is maximized, the threshold of intracavity power for self mode locking is minimized, and the effects of the gain saturation lens and the optical Kerr lens on the cavity mode are enhanced by each other. Further, the size and location of the waist 17 of the pump beam 30 are designed and adjusted such that the distribution of the gain saturation lens along the gain medium is optimized, which is discussed in great detail below.

It is understood that the above conditions are intertwined with each other and the operation procedure to achieve these conditions greatly depends on the selection of the cavity configuration, the gain medium and optical Kerr medium, the laser wavelength, and so on. The detail description given below is to illustrate an operation procedure for a particular embodiment of which the gain saturation lens takes the same sign as the optical Kerr lens.

As a preferred embodiment, the laser system illustrated in FIG. 1 has been successfully operated to produce self starting, self mode-locked pulses. In this operation, the gain medium 22 is a 1.5-cm Ti:sapphire rod with Brewster-angle cut on both ends. The spherical mirrors 16 and 18 are of 10-cm radius of curvature. The mirror 20 is a 3% output coupler. The prisms 24 and 26 are made of SF-10 glass with Brewster-angle cut. The width of the slit 28 is 2 mm and its opening is perpendicular to the plane of FIG. 1. The optical path length from mirror 12 to mirror 16 is 120 cm. The optical path length from mirror 18 to mirror 20 is 60 cm. The spacing between mirror 16 and 18 is approximately 10 cm. The pump beam 30 is delivered from an all-line argon laser of 7 Watt. The pump lens is of 10-cm of focal length.

First, the laser wavelength was tuned to around 840 nm, where the gain related index change is maximum and the gain saturation lens is positive. Because the optical Kerr lens in a crystal like Ti:sapphire is always positive, a positive gain saturation lens induces a cavity loss modulation in a similar manner as an optical Kerr lens does.

Second, a relatively small output coupler 20 was used to achieve a low lasting threshold. In the experiment, the output coupler 20 was 3% and a lasting threshold of 1.5 W pump power was achieved. With a pump power of 5.3 W and a proper space between mirrors 16 and 18, a laser output power of CW operation was 200 mW, and the beam profile consisted of approximately 60% TM$_{00}$ and 40% TM$_{01}$ modes. At this point, self mode locking could be started easily by moving the output coupler 20 along the cavity beam 34. With a further tuning of the spacing between mirrors 16 and 18, very strong self pulsing was observed with a fast photo-diode, as shown in FIG. 3a. The pulse duration was about 1 ns and the amplitude contrast was close to 100%. It is believed that this pulse formation is mainly attributed to the effect of gain saturation lens. The peak power density of the cavity laser beam at the Ti:sapphire crystal 22 is estimated about 10 MW/cm$^2$, which is not sufficient to onset the optical Kerr lens mode locking.

Then, the longitudinal positions of the spherical mirrors 16 and 18 and the pump lens 32 were further fine tuned. Stronger and stronger self pulsation was observed and the starting of the self mode locking became easier and easier. When the cavity alignment and the positions of the mirrors 16 and 18 and the pump lens 32 were optimized, self starting of the self mode locking was obtained. Once this alignment was achieved, the amplitude fluctuation of the pulse train was less than 2%, the laser beam profile was a clean $TM_{00}$ mode, and the self mode locking restored automatically after any blocking-and-unblocking of the laser cavity or the pump beam.

Figure 3B:
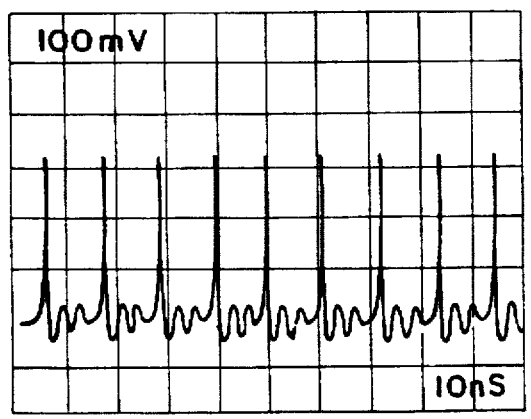
FIG. 3b is an oscilloscopic trace of a pulse train generated from the laser cavity of FIG. 1 when self starting, self mode locking is obtained.
Figure 3C:
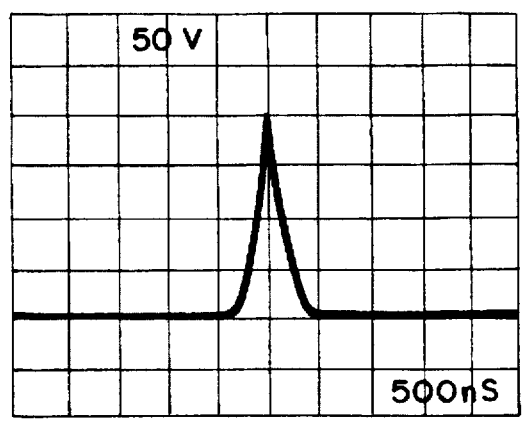
FIG. 3c is an auto-correlation trace of the pulse train generated from a self starting, self mode-locked Ti:sapphire laser of FIG. 1.

FIG. 3b shows a pulse train registered by the fast photodiode. FIG. 3c is an auto-correlation trace of the pulse train. The pulse duration was 91 fs, the laser output was 220 mW, and the spectral width was 10.3 nm.

The tunable range of the distance between the spherical mirrors 16 and 18 for self starting was about 30 microns, while the range for self mode locking was ten times wilder. Self starting was achieved with a pump power ranging from 4 W to 6 W, with the cavity short-arm length adjusted accordingly. Self mode locking was self sustained for hours even with many interruptions to the laser cavity and the pump laser. There was a time delay for the self mode locking to self start. This delay depended on the location and interval that the laser was blocked. Self mode locking recovered immediately (<10 ms) if the interruption lasted only a short time (<100 ms). There was also a 10% amplitude oscillation when the pulse was just self started. The building up of a thermal lens in the Ti:sapphire rod may be responsible for these transient behaviors.

To verify that the gain saturation lens is indeed a potential mechanism of self starting, the laser wavelength was tuned step by step away from the peak of the dispersion curve while the laser cavity alignment was maintained. It was found that self starting became increasingly difficult, and was impossible for laser wavelength shorter than 815 nm, while self mode locking was achievable at a wavelength as short as 805 nm. It was also found that self starting of the self mode locking was easier when a high reflection mirror was used to replaced the 3% output coupler 20. To understand how the gain saturation lens can be optimized to cascade with the optical Kerr lens to self start the self mode locking, we have analyzed the lens effect on a simplified laser cavity 100 as shown in FIG. 4a. In comparison to FIG. 1, we have used two lenses 116 and 118 (f=5 cm) to replace the two spherical mirrors in FIG. 1, omitted the two prisms, and made the cavity symmetric about its gain medium 122. For a cavity length of two meters and a beam waist 17 of 0.4 mm at the end mirror, we calculated the induced lens effect on the cavity mode structure, using a computer program based on the method of ABCD matrix. First we calculated the beam waist at the symmetric point of the cavity and found it to be about 20 microns. This beam waist 17 corresponds to a confocal beam parameter $z_0$ of about 2 mm in sapphire, for a wavelength of 840 nm. For a Ti:sapphire crystal of 15 mm long, the induced lens thus takes place over a range many times of $z_0$.

We then treated the induced lens as a stack of thin lenses distributed along the crystal and calculated the effect of a pair of these thin lenses on the cavity mode. We found that when a pair of positive lenses (140 and 142) are located symmetrically within the one confocal parameter zone, their effect is to increase the cavity beam size near the end mirrors, as shown in FIG. 4b. The effect will be opposite if the lenses (144 and 146) are located outside this $z_0$ zone, as shown in FIG. 4c. For an induced lens spread both inside and outside this $z_0$ zone, their effect on the cavity beam size is thus partially canceled. We further calculated the optical Kerr lens for FIG. 4a and found that its effect on the beam size at the end mirror would be doubled if there were no lens induced within the one-$z_0$ zone. These results indicate that not only the magnitude but also the distribution of the induced lenses controls the cavity loss modulation.

Because the optical Kerr lens is induced by the laser beam itself, the distribution of this lens is always symmetric to the beam waist at the Ti:sapphire crystal, provided that the beam waist is well within the crystal. The distribution of the gain saturation lens, on the other hand, depends on the positions of both the laser and the pump beam waists and on the gain variation along the crystal. Thus, the cavity loss modulation caused by the gain saturation lens can be adjusted by varying the position of the pump beam waist and its confocal beam parameter. In out experiment, this adjustment was achieved by choosing the focal length and by tuning the position of the pump lens.

The demonstration of the self starting makes the self mode-locked Ti:sapphire lasers a more practical laser source of sub-picosecond pulses. While FIG. 1 is a preferred embodiment and the alignment procedure described above are limited to this particular embodiment, the present invention of self starting of self mode locking through optimizing and cascading a gain saturation lens and an optical Kerr lens can be extended to other cavity configurations, other gain media, other wavelength coverage, other relative phase between the gain saturation lens and optical Kerr lens, and other alignment procedures.

While the present invention has been described with reference to a particular embodiment thereof, it will be understood that numerous modifications can be made by those skilled in the art without actually departing from the scope of the invention. Accordingly, all modifications and equivalents may be resorted to which fall within the scope of the invention as claimed.

What we claim is:

1. A self starting, self mode-locked laser comprising:
   a saturable gain medium for generating a gain saturation lens;
   an optical Kerr medium for generating a positive optical Kerr lens;
   an optical resonant cavity housing said saturable gain medium and said optical Kerr medium; and
   a laser beam having a frequency that when directed through said gain medium and said Kerr lens produces a positive gain saturation lens with maximum gain related index change and automatically initiating a self mode-locked pulsed laser beam exiting from said Kerr lens, said self mode-locked laser beam being initiated only by said gain saturation lens and maintained only by said positive optical Kerr lens.

2. A laser as defined in claim 1 wherein said optical resonant cavity produces a beam spot size no greater than 200 microns in said gain medium such that a gain saturation lens is induced in said saturable gain medium.

3. A laser as defined in claim 1 wherein the cavity loss modulation of said optical resonant cavity is induced by said saturation gain lens.

4. A laser as defined in claim 1 wherein the gain medium is a Ti doped laser crystal.

5. A laser as defined in claim 1 wherein the gain medium is a Cr doped laser crystal.

6. A laser as defined in claim 1 wherein said optical resonant cavity produces a beam spot not greater than 200 microns in said optical Kerr medium such that an optical Kerr lens is induced in said optical Kerr medium.

7. A laser as defined in claim 1 additionally comprising cavity loss modulation of said optical resonant cavity produced by said optical Kerr lens.

8. A laser as defined in claim 1 wherein an ultra-short laser pulse is generated and sustained by said optical Kerr lens.

9. A laser as defined in claim 1 wherein the mode-locked pulsed laser beam is initiated by said saturated lens, cascaded to and maintained by said Kerr lens within said optical resonant cavity.

10. A laser as defined in claim 1 wherein said saturable gain medium has a saturation energy density no greater than to 20 mJ/cm$^2$.

11. A laser as defined in claim 1 wherein said optical Kerr medium has a non-linearity greater than $10^{-16}$cm$^2$/W.

12. A laser as defined in claim 1 wherein said saturable gain medium and said optical Kerr medium co-exist in a single laser crystal medium.

13. A laser as defined in claim 12 wherein said laser crystal medium is a Ti:saphire laser crystal.

14. A laser as defined in claim 1 wherein said means for exciting said saturable gain medium is an argon laser beam.

15. A laser as defined in claim 1 wherein said means for exciting said saturable gain medium is a diode laser beam.

* * * * *